US008929186B1

(12) United States Patent
Sharma et al.

(10) Patent No.: US 8,929,186 B1
(45) Date of Patent: Jan. 6, 2015

(54) DISK DRIVE CALIBRATING LASER POWER FOR HEAT ASSISTED MAGNETIC RECORDING BASED ON QUALITY METRIC AND TRACK WIDTH

(71) Applicant: Western Digital Technologies, Inc., Irvine, CA (US)

(72) Inventors: Abhimanyu Sharma, Costa Mesa, CA (US); Poornima Nookala, Irvine, CA (US); Zhaobin Zhu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/763,972

(22) Filed: Feb. 11, 2013

(51) Int. Cl.
*G11B 7/00* (2006.01)
*G11B 7/12* (2012.01)
*G11B 7/24* (2013.01)
*G11B 13/04* (2006.01)

(52) U.S. Cl.
CPC ...................................... *G11B 13/04* (2013.01)
USPC .................. 369/47.53; 369/53.33; 369/53.31; 369/47.5

(58) Field of Classification Search
USPC ................ 369/47.53, 47.5, 53.2, 59.1, 124.1, 369/53.33, 53.34; 360/77.08, 77.02, 66, 62, 360/55
See application file for complete search history.

(56) References Cited

U.S. PATENT DOCUMENTS

| | | | |
|---|---|---|---|
| 5,774,299 A * | 6/1998 | Baum et al. | 360/77.08 |
| 5,949,747 A | 9/1999 | Miyashita et al. | |
| 6,650,599 B2 | 11/2003 | Takagi et al. | |
| 6,859,426 B1 | 2/2005 | Ogawa et al. | |
| 6,990,050 B2 | 1/2006 | Shiozaki et al. | |
| 7,215,616 B2 | 5/2007 | Bakx et al. | |
| 7,245,571 B2 | 7/2007 | Shimizu et al. | |
| 7,864,475 B2 | 1/2011 | Nakamura | |
| 8,004,957 B2 | 8/2011 | Yasukawa et al. | |
| 8,330,471 B2 * | 12/2012 | Suda | 324/537 |
| 2004/0052178 A1 * | 3/2004 | Saga | 369/47.53 |
| 2007/0086325 A1 * | 4/2007 | Ito et al. | 369/275.3 |
| 2007/0280079 A1 * | 12/2007 | Cheng et al. | 369/59.1 |
| 2008/0253749 A1 * | 10/2008 | Kablau et al. | 386/126 |
| 2009/0168623 A1 * | 7/2009 | Furumiya | 369/53.2 |
| 2010/0054097 A1 * | 3/2010 | Miyashita et al. | 369/47.53 |
| 2010/0232268 A1 * | 9/2010 | Shintani et al. | 369/47.5 |
| 2010/0290328 A1 * | 11/2010 | Eto et al. | 369/47.53 |
| 2011/0205861 A1 | 8/2011 | Erden et al. | |

FOREIGN PATENT DOCUMENTS

WO    WO2004114291 A1    12/2004

* cited by examiner

*Primary Examiner* — Wayne Young
*Assistant Examiner* — Dionne Pendleton

(57) ABSTRACT

A disk drive is disclosed comprising a head actuated over a disk, wherein the head comprises a laser operable to heat the disk while writing data to the disk. A laser power of the laser is initialized, and a test pattern is written to the disk. The test pattern is read from the disk to generate a read signal, and a quality metric and a track width of the test pattern is measured based on the read signal. The laser power is adjusted and the process is repeated until at least one of the quality metric substantially matches a target value and the track width substantially matches a track width threshold.

20 Claims, 4 Drawing Sheets

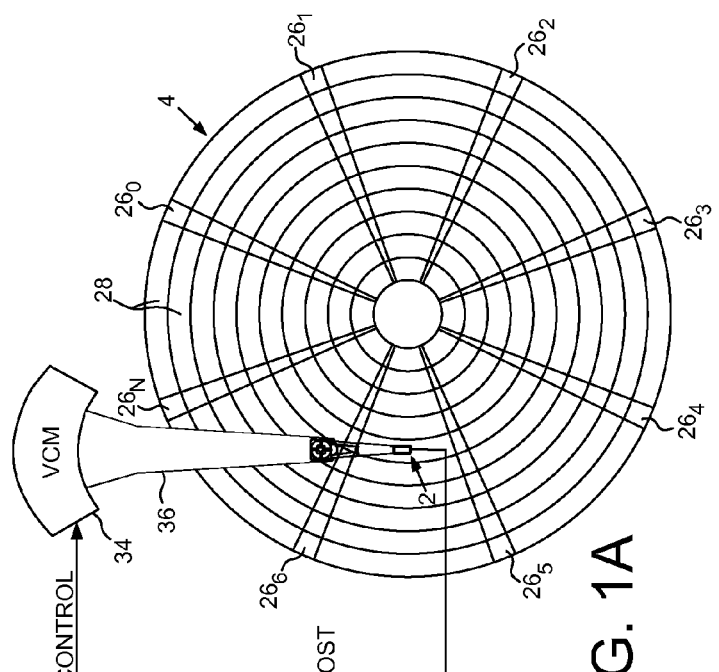
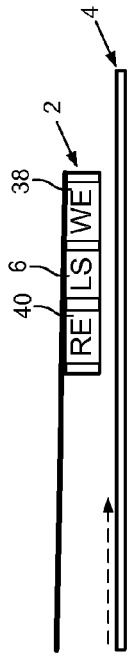
FIG. 1A
FIG. 1B
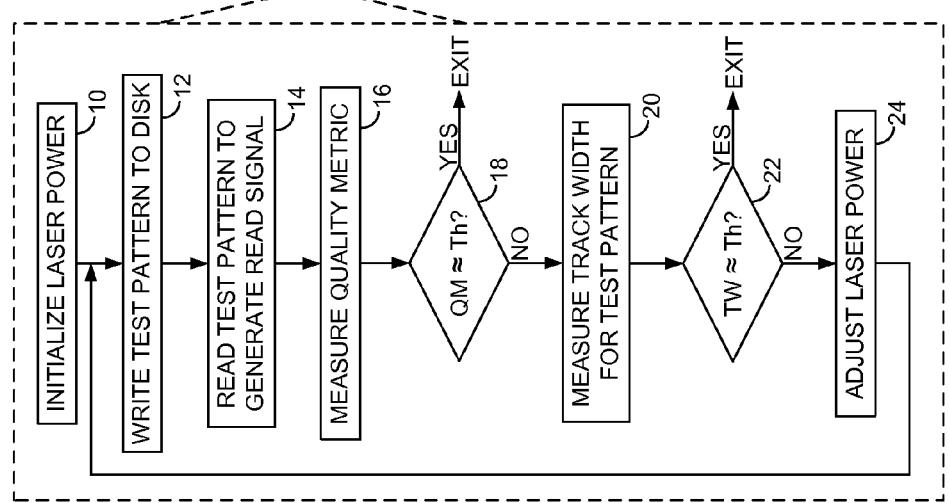
FIG. 1C

DISK DRIVE CALIBRATING LASER POWER FOR HEAT ASSISTED MAGNETIC RECORDING BASED ON QUALITY METRIC AND TRACK WIDTH

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIG. 1A shows a disk drive according to an embodiment comprising a head actuated over a disk.

FIG. 1B shows an embodiment of the head comprising a laser operable to heat the disk while writing data to the disk.

FIG. 1C is a flow diagram according to an embodiment wherein a laser power of the laser is calibrated based on a quality metric and a track width.

DETAILED DESCRIPTION

Figure 2:
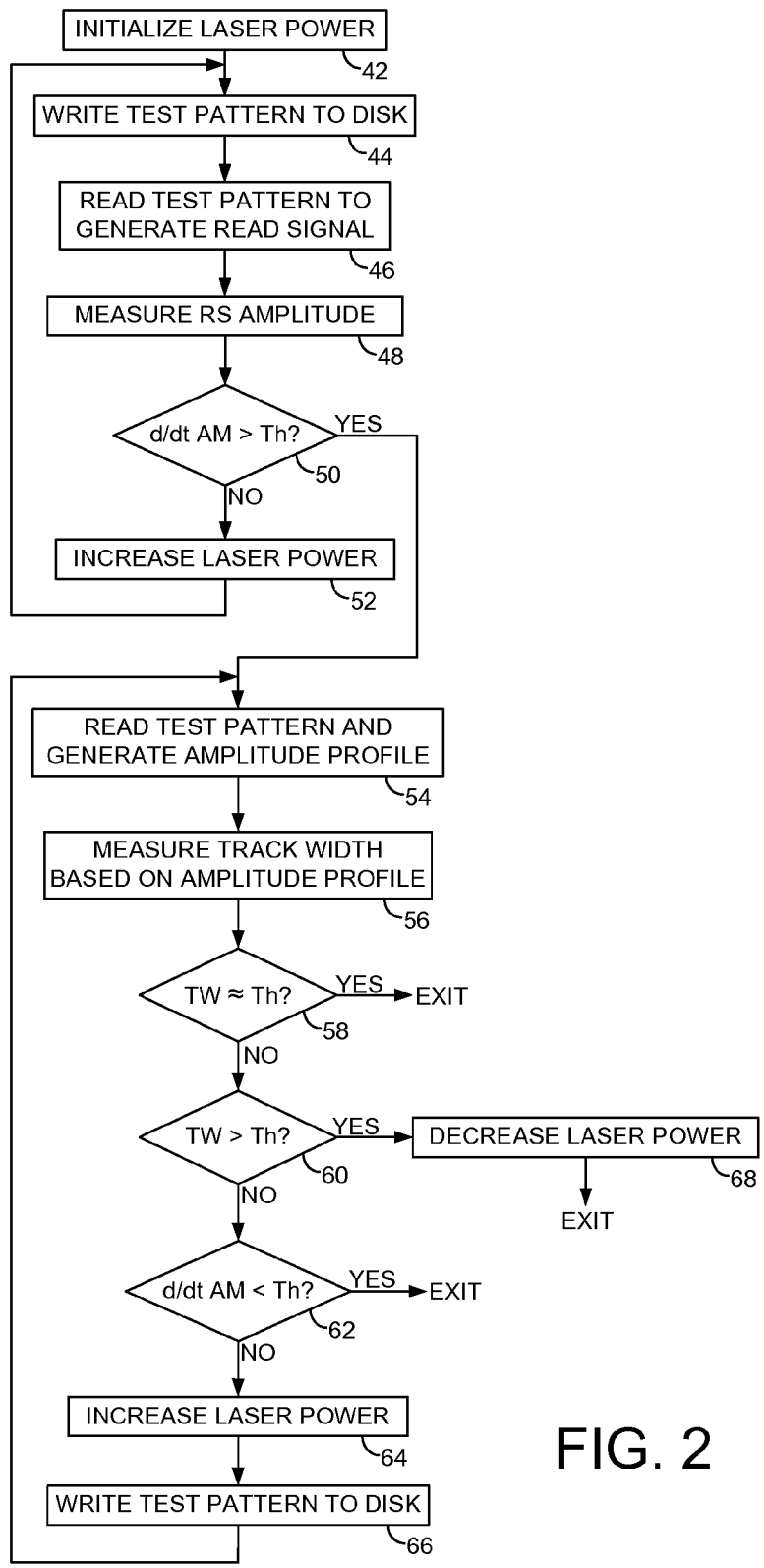
FIG. 2 is a flow diagram according to an embodiment wherein the quality metric and track width are measured by generating an amplitude profile of the read signal across the track.

FIG. 1A shows a disk drive according to an embodiment comprising a head 2 (FIG. 1B) actuated over a disk 4, wherein the head 2 comprises a laser 6 operable to heat the disk 4 while writing data to the disk 4. The disk drive further comprises control circuitry 8 operable to execute the flow diagram of FIG. 1C, wherein a laser power of the laser is initialized (block 10), and a test pattern is written to the disk (block 12). The test pattern is read from the disk to generate a read signal (block 14), and a quality metric (block 16) and a track width of the test pattern (block 20) is measured based on the read signal. The laser power is adjusted (block 24) and the process is repeated until at least one of the quality metric substantially matches a target value (block 18) and the track width substantially matches a track width threshold (block 22).

In the embodiment of FIG. 1A, the disk 4 comprises embedded servo sectors $26_0$-$26_N$ that define a plurality of servo tracks, wherein data tracks 28 are defined relative to the servo tracks at the same or different radial density. The control circuitry 8 processes a read signal 30 emanating from the head 2 to demodulate the servo sectors $26_0$-$26_N$ and generate a position error signal (PES) representing an error between the actual position of the head and a target position relative to a target track. The control circuitry 8 filters the PES using a suitable compensation filter to generate a control signal 32 applied to a voice coil motor (VCM) 34 which rotates an actuator arm 36 about a pivot in order to actuate the head 2 radially over the disk in a direction that reduces the PES. The servo sectors $26_0$-$26_N$ may comprise any suitable position information, such as a track address for coarse positioning and servo bursts for fine positioning. The servo bursts may comprise any suitable pattern, such as the amplitude-based servo pattern, or a suitable phase-based servo pattern.

The head 2 shown in the embodiment of FIG. 1B comprises a suitable write element 38, such as an inductive write element, and a suitable read element 40, such as a magnetoresistive read element. The quality of the read signal 30 generated when reading the test pattern depends on the laser power when writing the test pattern to the disk. Any suitable quality metric may be measured to evaluate the quality of the read signal 30, such as the amplitude of the read signal. As the laser power increases during the write operation, there is a corresponding increase in the amplitude of the read signal due to an increased saturation of the magnetic media. The laser power applied during a write operation also determines the resulting track width, where it may be desirable to limit the track width in order to maximize the radial density of the data tracks. Accordingly, in the embodiments the laser power employed during write operations is optimized so as to achieve a target quality metric for the read signal with a constraint that the track width not exceed a track width threshold.

An embodiment is described with reference to the flow diagram of FIG. 2 and further in view of the examples shown in FIGS. 3A-3B and 4A-4B. The laser power is initialized (block 42), where in the embodiment shown in FIG. 3A, the laser power is initialized to a low value. The test pattern is written to the disk (block 44), and then read from the disk to generate the read signal (block 46). The amplitude of the read signal is measured (block 48), and a derivative of the amplitude is evaluated. If the derivative of the amplitude does not exceed a threshold (block 50), the laser power is increased (block 52), such as by incrementing a digital-to-analog converter (DAC), and the flow diagram is repeated from block 44 until the derivative of the amplitude exceeds the threshold at block 50. FIG. 3A illustrates this embodiment, wherein the derivative of the amplitude exceeds the threshold when the laser power reaches setting 70.

Figure 4A:
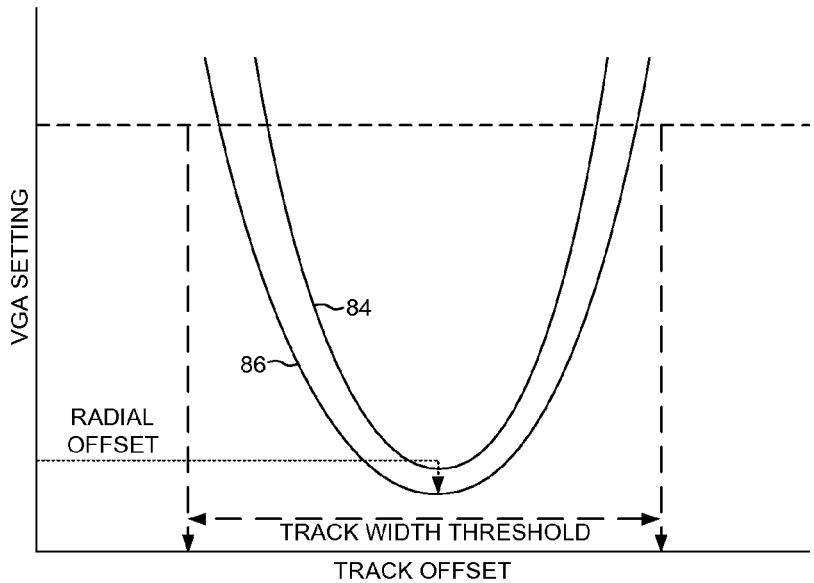
FIGS. 4A and 4B illustrate an embodiment wherein an amplitude profile of the read signal is generated by scanning the head across the track, and the quality metric and track width are measured based on the amplitude profile.

In some embodiments, after the derivative of the amplitude exceeds the threshold at block 50, the test pattern is read multiple times at different radial offsets (i.e., the head is scanned across the test pattern) and a corresponding amplitude of the read signal measured to generate an amplitude profile of the read signal (block 54). A track width of the test pattern can then be measured based on the amplitude profile (block 56). An example amplitude profile relative to the track offset is illustrated in FIG. 4A, wherein a setting for a variable gain amplifier (VGA) represents the amplitude of the read signal. The VGA amplifies the read signal toward a target amplitude, and therefore the amplitude of the read signal may be represented as the inverse of the VGA setting. The VGA setting increases as the head deviates from the center of the test pattern due to the decrease in the amplitude of the read signal.

In one embodiment, the track width is measured relative to a target VGA setting as illustrated in FIG. 4A. That is, the track width may be defined as a percentage of amplitude attenuation relative to the track offset. As shown in FIGS. 3A and 4A, in the embodiments a track width threshold is defined that limits the maximum laser power. Referring to the example embodiment of FIG. 3A, the track width is significantly less than the track width threshold when the laser power reaches setting 70. Therefore, in one embodiment, the measured track width will not substantially match the track width threshold at block 58, or exceed the track width threshold at block 60. The derivative of the amplitude is therefore, in one embodiment, evaluated and compared to a threshold at block 62. If the derivative is less than the threshold at block 62 (which it will at laser power 70 of FIG. 3A), then the laser power is increased (block 64) and the test pattern is rewritten to the disk (block 66). The flow diagram of FIG. 2 is then repeated from block 54 until one of the conditions is satisfied at block 58, block 60, or block 62.

In the example of FIG. 3A, the derivative of the amplitude will fall below the threshold at block 62 of FIG. 2 before the track width reaches the track width threshold. That is, the derivative of the amplitude will fall below the threshold at point 72 of FIG. 3A, whereas the track width will have reached point 74 which is less than the track width threshold. Therefore, in one embodiment, the laser power setting 76 will be selected as the operating laser power. In the example of FIG. 3B, the track width reaches the track width threshold at point 78 before the derivative of the amplitude falls below the threshold at point 80. Therefore, in one embodiment, the laser power setting 82 will be selected as the operating laser power in order to limit the track width.

The difference between the read signal amplitude versus laser power curves of FIGS. 3A and 3B may be due to different head/surface combinations, or it may be due to different zones on the same disk surface. That is, in one embodiment the laser power is calibrated for each head/surface combination, and/or for each zone of each disk surface, where each zone comprises a plurality of the data tracks (a radial segment of the disk surface).

Figure 3A:
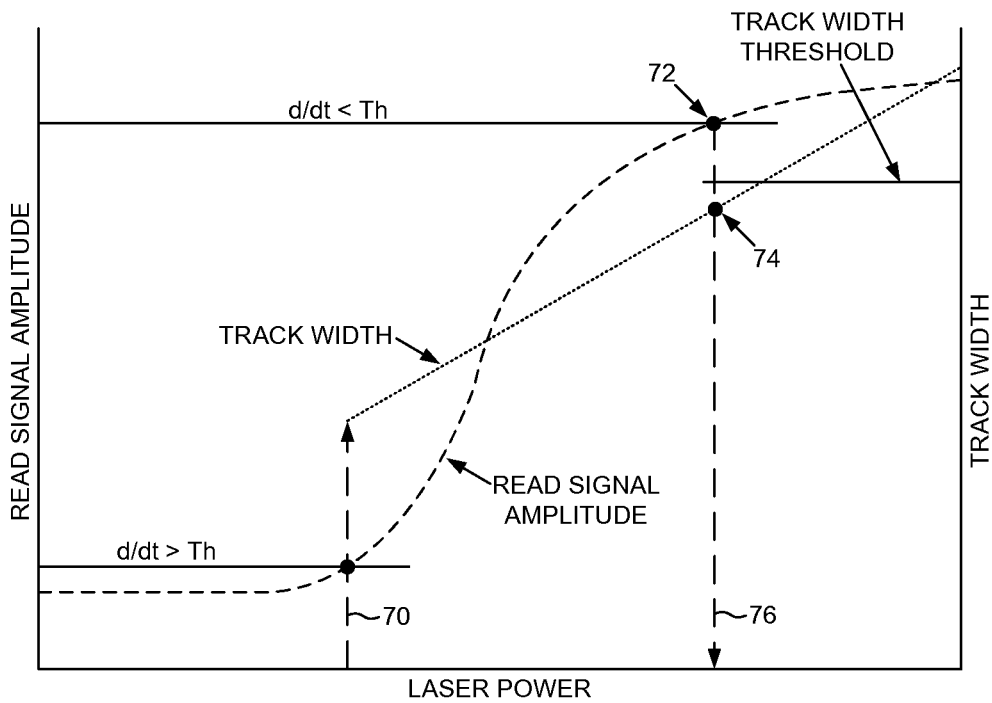
FIG. 3A illustrates an embodiment wherein the quality metric reaches the threshold before the track width.
Figure 3B:
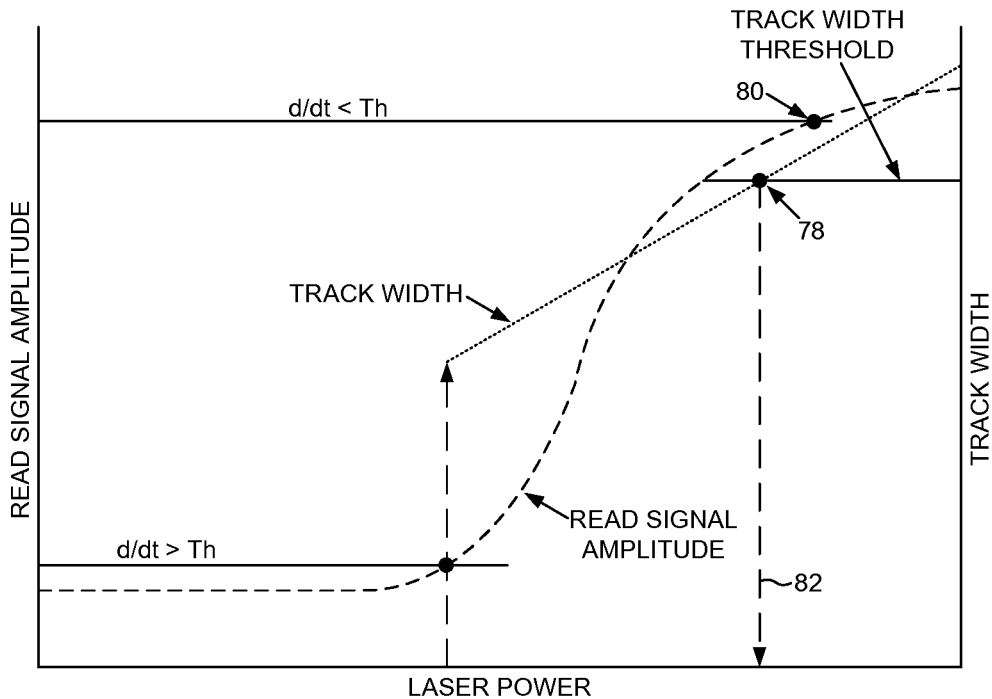
FIG. 3B illustrates an embodiment wherein the track width reaches the threshold before the quality metric.
Figure 4B:
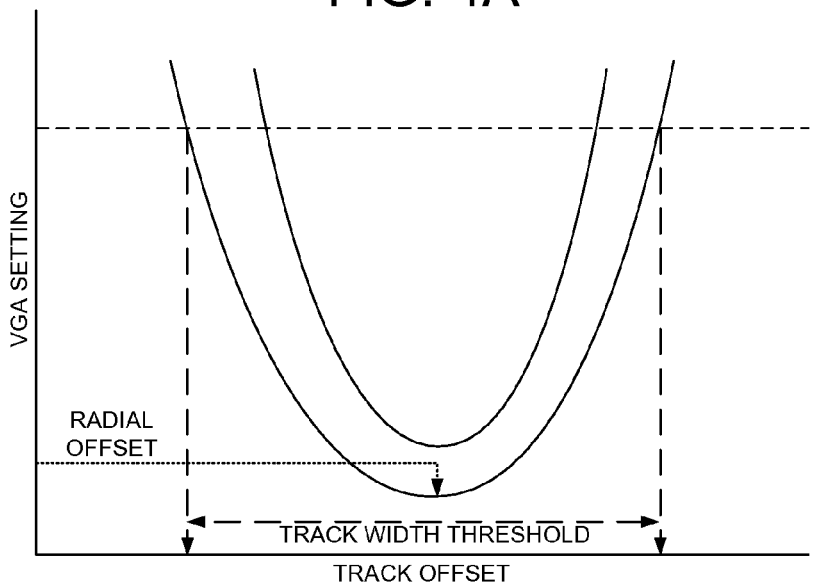

FIG. 4A corresponds to the example of FIG. 3A where the derivative of the read signal amplitude falls below a threshold (at point 72) before the track width (at point 74) reaches the track width threshold. The first amplitude profile 84 in FIG. 4A corresponds to the power setting for the laser just prior to the next higher setting that generates the second amplitude profile 86. The difference between the two curves is small, which is why the derivative of the amplitude falls below the threshold at block 62 of FIG. 2. FIG. 4B corresponds to the example of FIG. 3B where the track width reaches the track width threshold (at point 78) before the derivative of the read signal amplitude falls below the threshold (at point 80). In one embodiment, increasing the laser power at block 64 of FIG. 2 causes the track width to exceed the track width threshold at block 60. For example, the laser power may be incremented in DAC counts having a low enough resolution that the final increment in the DAC count will cause the track width to exceed the track width threshold at block 60. When this happens, the laser power may be decreased (block 68), such as by decrementing the DAC count by one setting so that the track width does not exceed the track width threshold.

Figure 4C:
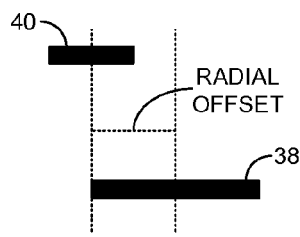
FIG. 4C illustrates an embodiment wherein a radial offset between a read element and a write element of the head is measured based on the amplitude profile of the read signal.

In one embodiment, the amplitude of the read signal evaluated at block 62 of FIG. 2 is measured at a maximum of the read signal amplitude profile (i.e., at the minimum of the VGA setting in FIG. 4A). FIG. 4C shows an embodiment wherein the write element 38 is radially offset from the read element 40. When the test pattern is written to the disk at block 44 of FIG. 2, the radial offset may be unknown. In one embodiment, a coarse estimate of the radial offset may be measured by generating a single read signal amplitude profile such as shown in FIG. 4A. The radial offset may then be estimated as the difference between the radial location of the read element 40 while writing the test pattern, and the radial location of the minimum VGA setting generated while reading the test pattern as shown in FIG. 4A. After measuring the coarse estimate for the radial offset, this initial radial offset may be used to read the test pattern at block 46 in order to measure the read signal amplitude (e.g., without generating the entire amplitude profile as in FIG. 4A). Once the derivative of the read signal amplitude exceeds the threshold at block 50, the control circuitry begins to generate the entire amplitude profile across the test pattern as illustrated in FIG. 4A for each increment in the laser power so that the track width can be measured for each increment of the laser power as illustrated in FIG. 3A (when the laser power reaches setting 70).

In one embodiment, a final more accurate estimate for the radial offset between the write element 38 and read element 40 may be generated by averaging or otherwise combining all of the amplitude profiles generated for each laser power setting, and then measuring the track offset from the origin of FIG. 4A to the average minimum VGA setting. This final radial offset may then be used during normal write/read operations for the disk drive (i.e., as a jog value).

Although in the above embodiments the quality metric evaluated at block 18 of FIG. 1C is described as an amplitude of the read signal (or VGA setting), any suitable quality metric may be measured, such as an amplitude of noise in the read signal which may be measured by subtracting expected samples from the read signal samples (based on a desired target response, such as a partial response). In another embodiment, the quality metric may be generated based on the performance of a sequence detector, such as a number of bit errors made by the sequence detector, or a number of iterations (of an iterative sequence detector) required to recover the test pattern. Similarly, any suitable quality metric may be measured to generate the cross track profile used to estimate the track width of the test pattern (instead of, or in addition to, the amplitude of the read signal). In one embodiment, the quality metric of the read signal measured at block 18 of FIG. 1C may be different than the quality metric used to measure the track width at block 20.

In yet another embodiment, after calibrating the laser power based on the flow diagram of FIG. 1C (or FIG. 2), the calibrated laser power may be further evaluated to verify that a target tracks per inch (TPI) is still achievable. For example, the calibrated laser power may be used to write a test pattern to multiple adjacent tracks and then the adjacent tracks evaluated to ensure that the intertrack interference is within an acceptable tolerance (e.g., by evaluating the bit error rate of side tracks after multiple writes to a center track).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk;
a head actuated over the disk, wherein the head comprises a laser operable to heat the disk while writing data to the disk; and
control circuitry operable to:
a) initialize a laser power of the laser;
b) write a test pattern to the disk;
c) read the test pattern from the disk to generate a read signal;
d) measure a quality metric of the read signal;
e) measure a track width of the test pattern based on the read signal;
f) adjust the laser power and repeat elements (b) through (f) until the track width substantially matches a track width threshold; and
g) terminate the repeating in element (f) when the quality metric of the read signal substantially matches a target value.

2. The disk drive as recited in claim 1, wherein the control circuitry is further operable to adjust the laser power at element (f) by increasing the laser power.

3. The disk drive as recited in claim 1, wherein the quality metric comprises an amplitude of the read signal.

4. The disk drive as recited in claim 3, wherein the quality metric comprises a setting for a variable gain amplifier.

5. The disk drive as recited in claim 3, wherein the quality metric substantially matches the target value when a derivative of the amplitude of the read signal falls below a target threshold.

6. The disk drive as recited in claim 1, wherein the control circuitry is further operable to decrease the laser power after element (f) when the track width exceeds the track width threshold.

7. The disk drive as recited in claim 1, wherein the control circuitry is operable to measure the track width by scanning the head across the test pattern to generate an amplitude profile of the read signal.

8. The disk drive as recited in claim 7, wherein the quality metric corresponds to a maximum in the amplitude profile of the read signal.

9. The disk drive as recited in claim 7, wherein:
the head comprises a write element radially offset from a read element; and
the control circuitry is further operable to measure the radial offset based on the amplitude profile.

10. The disk drive as recited in claim 9, wherein the radial offset is based on a maximum in the amplitude profile of the read signal.

11. A method of operating a disk drive comprising a head actuated over a disk, wherein the head comprises a laser operable to heat the disk while writing data to the disk, the method comprising:
a) initializing a laser power of the laser;
b) writing a test pattern to the disk;
c) reading the test pattern from the disk to generate a read signal;
d) measuring a quality metric of the read signal;
e) measuring a track width of the test pattern based on the read signal;
f) adjusting the laser power and repeating elements (b) through (f) until the track width substantially matches a track width threshold; and
g) terminating the repeating in element (f) when the quality metric of the read signal substantially matches a target value.

12. The method as recited in claim 11, further comprising adjusting the laser power at element (f) by increasing the laser power.

13. The method as recited in claim 11, wherein the quality metric comprises an amplitude of the read signal.

14. The method as recited in claim 13, wherein the quality metric comprises a setting for a variable gain amplifier.

15. The method as recited in claim 13, wherein the quality metric substantially matches the target value when a derivative of the amplitude of the read signal falls below a target threshold.

16. The method as recited in claim 11, further comprising decreasing the laser power after element (f) when the track width exceeds the track width threshold.

17. The method as recited in claim 11, further comprising measuring the track width by scanning the head across the test pattern to generate an amplitude profile of the read signal.

18. The method as recited in claim 17, wherein the quality metric corresponds to a maximum in the amplitude profile of the read signal.

19. The method as recited in claim 17, wherein:
- the head comprises a write element radially offset from a read element; and
- the method further comprises measuring the radial offset based on the amplitude profile.

20. The method as recited in claim 19, wherein the radial offset is based on a maximum in the amplitude profile of the read signal.

\* \* \* \* \*